US008851971B1

(12) United States Patent
Boyle et al.

(10) Patent No.: US 8,851,971 B1
(45) Date of Patent: Oct. 7, 2014

(54) METHOD AND SYSTEM FOR DYNAMIC BINDING OF PRIZES TO MULTI-OUTCOME GAMES

(75) Inventors: Stephen S. Boyle, Lincoln, CA (US); Russell S. Greer, Los Gatos, CA (US)

(73) Assignee: Joingo, LLC, San Jose, CA (US)

( * ) Notice: Subject to any disclaimer, the term of this patent is extended or adjusted under 35 U.S.C. 154(b) by 44 days.

(21) Appl. No.: 13/310,741

(22) Filed: Dec. 3, 2011

Related U.S. Application Data

(60) Provisional application No. 61/419,413, filed on Dec. 3, 2010.

(51) Int. Cl.
*A63F 9/24* (2006.01)
*A63F 13/00* (2014.01)
*G06F 17/00* (2006.01)

(52) U.S. Cl.
USPC .................................. 463/20; 463/25; 463/42

(58) Field of Classification Search
USPC ................................................ 463/20, 25, 42
See application file for complete search history.

(56) References Cited

U.S. PATENT DOCUMENTS

2008/0146309 A1 6/2008 Bennett
2008/0195945 A1 * 8/2008 Vaughan et al. .............. 715/708
2010/0004045 A1 1/2010 Roemer
2010/0167813 A1 7/2010 Luciano, Jr. et al.
2011/0111826 A1 * 5/2011 Baerlocher et al. ............. 463/20
2011/0191152 A1 8/2011 Schwartz

* cited by examiner

*Primary Examiner* — William M. Brewster
(74) *Attorney, Agent, or Firm* — Clause Eight IPS; Michael Catania

(57) ABSTRACT

A method and system for dynamically binding prizes to a multi-outcome game. The invention allows an enterprise to generate a playerlist of customer names from a CRM database of the enterprise and send a game application from a content server to the customers on the playerlist while dynamically binding prizes and outcomes of the game application just prior to or during transmission of the game application to the data capable communication devices of the customers on the playerlist.

15 Claims, 5 Drawing Sheets

METHOD AND SYSTEM FOR DYNAMIC BINDING OF PRIZES TO MULTI-OUTCOME GAMES

CROSS REFERENCES TO RELATED APPLICATIONS

The Present Application claims priority to U.S. Provisional Patent Application No. 61/419,413, filed on Dec. 3, 2010, which is hereby incorporated by reference in its entirety.

STATEMENT REGARDING FEDERALLY SPONSORED RESEARCH OR DEVELOPMENT

Not Applicable

BACKGROUND OF THE INVENTION

1. Field of the Invention

The present invention generally relates to mobile communication interactions between customers and enterprises and/or reward clubs. More specifically, the present invention relates to a method and system for interacting with a member of an enterprise's rewards club through mobile communication devices.

2. Description of the Related Art

The use of mobile phones, handsets and other wireless devices is becoming a primary means for individuals to stay connected in their personal and professional lives. Mobile handsets and other wireless devices are being targeted by businesses to aid in the marketing efforts of the business to deliver specific content directly to prospective customers. One method of mobile marketing includes sending interactive games to customers that offer prizes that will incent customers to patronize the business.

The prior art has disclosed various means for motivating customers and providing interactive games for customers.

Bennett, U.S Patent Publication Number 20080146309 for a Gaming Console And System Having Dynamic Feature Game discloses triggers in a game on a slot machine that alter the possible outcomes of the game.

Luciano, J R. et al., U.S. Patent Publication Number 20100167813, for a Dynamic Paytable For Interactive Games, discloses a gaming system that determines whether a player gets a prize depending on the player's actions, for example when the player terminates his or her play.

Roemer, U.S. Patent Publication Number 20100004045 for a Method And System For Awarding Bonuses Via Telecommunication Links discloses calling members of a casino player rewards club to award bonuses to the player.

Schwartz, U.S. Patent Publication Number 20110191152 for Assigning A Mobile-Redeemable Personal Identification Number To A Consumer As A Mobile Reward Or Following A Purchase Of A Promotional Item discloses a method to promote the sale of branded products through in-store acquisition of branded products or out-of store promotions designed to enhance retention of mobile rewards including one or more the following rewards: mobile sweepstake ballots, mobile loyalty points, and mobile coupons.

General definitions for terms utilized in the pertinent art are set forth below.

GSM, Global System for Mobile Communications is a second generation digital cellular network.

Code Division Multiple Access ("CDMA") is a spread spectrum communication system used in second generation and third generation cellular networks, and is described in U.S. Pat. No. 4,901,307.

Long Term Evolution ("LTE") is a next generation communication network.

Interactive voice response ("IVR") is a telephone technology in which a user uses a phone to interact with a database to acquire information.

Short Message Service ("SMS") is text messaging communication using a mobile phone or other device to send messages up to 160 characters in length.

Multimedia messaging service ("MMS") communication is a communication transmitted to and from a mobile phone that includes a multimedia content such as a digital photograph (JPEG), videos, and the like.

A SMS Gateway is used to send text messages with or without a mobile phone, and is used by aggregators to forward text messages to mobile phones.

BLUETOOTH technology is a standard short range radio link that operates in the unlicensed 2.4 gigaHertz band.

Mobile Originated ("MO") is a text message that is sent from a mobile phone.

Mobile Terminated ("MT") is a text message that is sent to a mobile phone.

Public Switch Telephone Network ("PSTN") is a telecommunication system in which networks are inter-connected to allow telephones to communicate with each other throughout the world.

Telephone Consumer Protection Act ("TCPA") of 1991 restricts the use of SMS text messages received by mobile phones, and SMS messages sent without a consumer's consent can violate the TCPA.

APP is a software application for a mobile phone such as a smart phone.

Hypertext Transfer Protocol ("HTTP") is a set of conventions for controlling the transfer of information via the Internet from a web server computer to a client computer, and also from a client computer to a web server.

Internet is the worldwide, decentralized totality of server computers and data-transmission paths which can supply information to a connected and browser-equipped client computer, and can receive and forward information entered from the client computer.

FTP or File Transfer Protocol is a protocol for moving files over the Internet from one computer to another.

Short message peer-to-peer ("SMPP") is a telecommunications protocol for exchanging SMS messages between SMS peer entities.

Simple object access protocol ("SOAP") is a computer network protocol for exchanging information.

Simple mail transfer protocol ("SMTP") is a delivery protocol for email.

Transfer Control Protocol/Internet Protocol ("TCP/IP") is a protocol for moving files over the Internet.

A SMS aggregator is an entity that provides connectivity with a mobile phone carrier by offering a SMS gateway to send and receive messages and other digital content.

Application Programming Interface (API) is a collection of computer software code, usually a set of class definitions, that can perform a set of related complex tasks, but has a limited set of controls that may be manipulated by other software-code entities. The set of controls is deliberately limited for the sake of clarity and ease of use, so that programmers do not have to work with the detail contained within the given API itself.

Direct Inward Dialing ("DID") involves a carrier providing one or more trunk lines to a customer for connection to the customer's private branch exchange ("PBX") and a range of telephone lines are allocated to this line.

Voice over Internet Protocol ("VoIP") relates to communications transmitted over the Internet such as SKYPE.

URL or Uniform Resource Locator is an address on the World Wide Web.

User Interface or UI is the junction between a user and a computer program. An interface is a set of commands or menus through which a user communicates with a program. A command driven interface is one in which the user enter commands. A menu-driven interface is one in which the user selects command choices from various menus displayed on the screen.

Web-Browser is a complex software program, resident in a client computer, that is capable of loading and displaying text and images and exhibiting behaviors as encoded in HTML (HyperText Markup Language) from the Internet, and also from the client computer's memory. Major browsers include MICROSOFT INTERNET EXPLORER, NETSCAPE, APPLE SAFARI, MOZILLA FIREFOX, and OPERA.

Web-Server is a computer able to simultaneously manage many Internet information-exchange processes at the same time. Normally, server computers are more powerful than client computers, and are administratively and/or geographically centralized. An interactive-form information-collection process generally is controlled from a server computer, to which the sponsor of the process has access.

CRM (Customer Relationship Management) is a widely-implemented strategy for managing a company's interactions with customers, clients and sales prospects. CRM involves using technology to organize, automate, and synchronize business processes and the like—principally sales activities, but also business processes and the like for marketing, customer service and technical support.

Wireless Application Protocol ("WAP") is an open, global specification that empowers users with mobile wireless communication devices (such as mobile phones) to easily access data and to interact with Websites over the Internet through such mobile wireless communication device. WAP works with most wireless communication networks such as CDPD, CDMA, GSM, PDC, PHS, TDMA, FLEX, reflex, iDEN, TETRA, DECT, DataTAC, Mobitex and GRPS. WAP can be built on most operating systems including PalmOS, WINDOWS, CE, FLEXOS, OS/9, JavaOS and others.

WAP Push is defined as an encoded WAP content message delivered (pushed) to a mobile communication device which includes a link to a WAP address.

One challenge in executing such a marketing campaign is that the prize offerings are inflexible, in that they are connected to the game at the time of the game design. This makes it necessary to re-program the game in the event that the marketer would like to update the prize offering.

Another challenge is to ensure that the customer experience is unique every time an offer to play the interactive game for prizes is offered. If the same games are consistently offering the same prizes, the customer will lose interest after having played the game once.

BRIEF SUMMARY OF THE INVENTION

The present invention dynamically binds win values and a paytable to a game sent to a customer of an enterprise. The prize offerings can be changed or updated without affecting the game itself since the game and what can be won by the customer are not connected at the time of the game design. The present invention allows an enterprise to tailor a promotion to a single customer or group of customers based on information known or collected by the enterprise about the customer, and information pertinent to the business of the enterprise.

The present invention also overcomes the challenge of presenting a new experience to the customer every time by defining a set of possible outcomes so that the game action is variable and random, even if the outcome is not.

The present invention allows a business to easily select the specific customers they would like to send an interactive game to, attaching to the game a specific set of possible prizes that the customer will see and a specific target prize that the customer will receive upon completion of the game. The present invention binds win values and the paytable to a game dynamically so that the prize offering can be easily changed and defines a set of possible outcomes so that the game action is variable and random, even if the outcome is not.

One aspect of the present invention is a method for dynamically binding prizes to a multi-outcome game. The method includes generating a playerlist from a plurality of customer names in a customer database of an enterprise. The method also includes selecting a game application to be sent to a data capable communication device of each customer of the playerlist. The method also includes assigning a template for the game application, the template having a prize paytable. The method also includes selecting at least one prize for the game application, the at least one prize having a win value. The method also includes dynamically binding the game application with the template. The method also includes transmitting the game application and the template to the data capable communication device of each customer of the playerlist.

Another aspect of the present invention is a method for dynamically binding prizes to a multi-outcome game. The method includes selecting a game application to be sent to a data capable communication device of each customer of a plurality of customers of a playerlist generated from an enterprise customer database. The method also includes selecting at least one prize for the game application, the at least one prize having a win value and a set of possible outcomes incorporated into a selected template. The method also includes dynamically binding the game application with the selected template at transmission of the game application and the selected template to the data capable communication device of each customer of the playerlist.

Yet another aspect of the present invention is a method for dynamically binding prizes to a multi-outcome game. The method includes generating a playerlist from a plurality of customer names in a customer database of an enterprise. The method also includes selecting a game application to be sent to a data capable communication device of each customer of the playerlist. The method also includes assigning a template for the game application, the template having a prize paytable. The method also includes determining at least one prize for populating in the prize paytable based on a database profile of each customer of the plurality of customer names on the playlist and an enterprise profile and selecting the at least one prize for the game application. The at least one prize has a win value. The enterprise profile comprises at least one of a geographical location of an enterprise in relation to each customer of the playerlist, a business of the enterprise, a business time period, a government regulation, and a marketing campaign of the enterprise. The database profile of each customer comprises at least one of a geographical location of the customer, contact information including phone number(s) and/or an email address, previous purchases of the customer, an age of the customer, an ethnicity of the customer, a political affiliation of the customer, a religious affiliation of the customer, an educational level of the customer, a college attended by the customer, past travels of the customer, a gender of the customer, a wireless phone carrier of the customer, a hobby of the customer, and a gaming preference of the customer. The method also includes dynamically binding the game application with the template. The method also includes transmitting the game application and the template to the data capable communication device of each customer of the playerlist.

Yet another aspect of the present invention is a method for dynamically binding prizes to a multi-outcome game. The method includes selecting a game application to be sent to a data capable communication device of each customer of a plurality of customers of a playerlist generated from an enterprise customer database. The method also includes determining at least one prize based on a database profile of each customer of the plurality of customer names on the playlist and an enterprise profile and selecting the at least one prize for the game application. The at least one prize has a win value and a set of possible outcomes incorporated into a selected template. The enterprise profile comprises at least one of a geographical location of an enterprise in relation to each customer of the playerlist, a business of the enterprise, a business time period, a government regulation, and a marketing campaign of the enterprise. The database profile of each customer comprises at least one of a geographical location of the customer, including phone number(s) and/or an email address, previous purchases of the customer, an age of the customer, an ethnicity of the customer, a political affiliation of the customer, a religious affiliation of the customer, an educational level of the customer, a college attended by the customer, past travels of the customer, a gender of the customer, a wireless phone carrier of the customer, a hobby of the customer, and a gaming preference of the customer. The method also includes dynamically binding the game application with the selected template at transmission of the game application and the selected template to the data capable communication device of each customer of the playerlist.

Yet another aspect of the present invention is a system for dynamically binding prizes to a multi-outcome game. The system includes data capable communication devices, a content server, a customer database, and a patron server. The data capable communication devices are associated with a playerlist, with each of the data capable communication devices comprising a mobile resident software application. The content server comprises a plurality of game applications and a plurality of templates. Each of the plurality of templates has a prize paytable. The customer database comprises a plurality of customer profiles. Each customer profile comprises at least one of a customer name, a geographical location of the customer, including phone number(s) and/or an email address, previous purchases of the customer, an age of the customer, an ethnicity of the customer, a political affiliation of the customer, a religious affiliation of the customer, an educational level of the customer, a college attended by the customer, past travels of the customer, a gender of the customer, a wireless phone carrier of the customer, a hobby of the customer, a gaming preference of the customer, and contact information for a data capable communication device of a customer. The patron server is in communication with the customer database and the content server. In operation of the system, a playerlist of customers to receive a game application is generated from the plurality of customer profiles at the customer database, and each game application is dynamically assigned a template referencing a prize value and a set of possible outcomes at transmission to the plurality of data capable communication devices associated with the playerlist.

Having briefly described the present invention, the above and further objects, features and advantages thereof will be recognized by those skilled in the pertinent art from the following detailed description of the invention when taken in conjunction with the accompanying drawings.

DETAILED DESCRIPTION OF THE INVENTION

The enterprise can be any type of organization that desires to reward customers, engage customers, conduct a mobile marketing campaign or similar mobile marketing program to customers. The enterprise can be a business like Exxon, Apple, Nordstrom or the like. The enterprise can be a non-profit or charity, like the American Red Cross. The enterprise can be a government agency like FEMA. The enterprise can be a political party. The enterprise can be an organization like the American Medical Association. Those skilled in the pertinent art will recognize other types of enterprises that can use the present invention.

The data capable communication device utilized with the present invention preferably include mobile phones, smartphones, tablet computers, PDAs and the like. Examples of smartphones include the IPHONE® smartphone from Apple, Inc., BLACKBERRY® smartphones from Research In Motion, the DROID® smartphone from Motorola Mobility Inc., and many more. Examples of tablet computing devices include the IPAD® tablet from Apple Inc., and the XOOM™ tablet from Motorola Mobility Inc.

Each of the interface descriptions preferably discloses use of at least one communication protocol to establish handshaking or bi-directional communications. These protocols preferably include but are not limited to XML, HTTP, TCP/IP, Serial, UDP, FTP, Web Services, WAP, SMTP, SMPP, DTS, Stored Procedures, Import/Export, Global Positioning Triangulation, IM, SMS, MMS, GPRS and Flash. The databases used with the system preferably include but are not limited to MSSQL, Access, MySQL, Progress, Oracle, DB2, Open Source DBs and others. Operating system used with the system preferably include Microsoft 2010, XP, Vista, 200o Server, 2003 Server, 2008 Server, Windows Mobile, Linux, Android, Unix, I series, AS 400 and Apple OS.

The underlying protocol at a server, is preferably Internet Protocol Suite (Transfer Control Protocol/Internet Protocol ("TCP/IP")), and the transmission protocol to receive a file is preferably a file transfer protocol ("FTP"), Hypertext Transfer Protocol ("HTTP") or other similar protocols. The transmission protocol ranges from SIP to MGCP to FTP and beyond. The protocol at the server is preferably HTTP.

A mobile communication service provider (aka phone carrier) of the customer such as VERIZON, AT&T, SPRINT, T-MOBILE, and the like mobile communication service providers, provide the communication network for communication to the data capable communication device of the customer.

Figure 1:
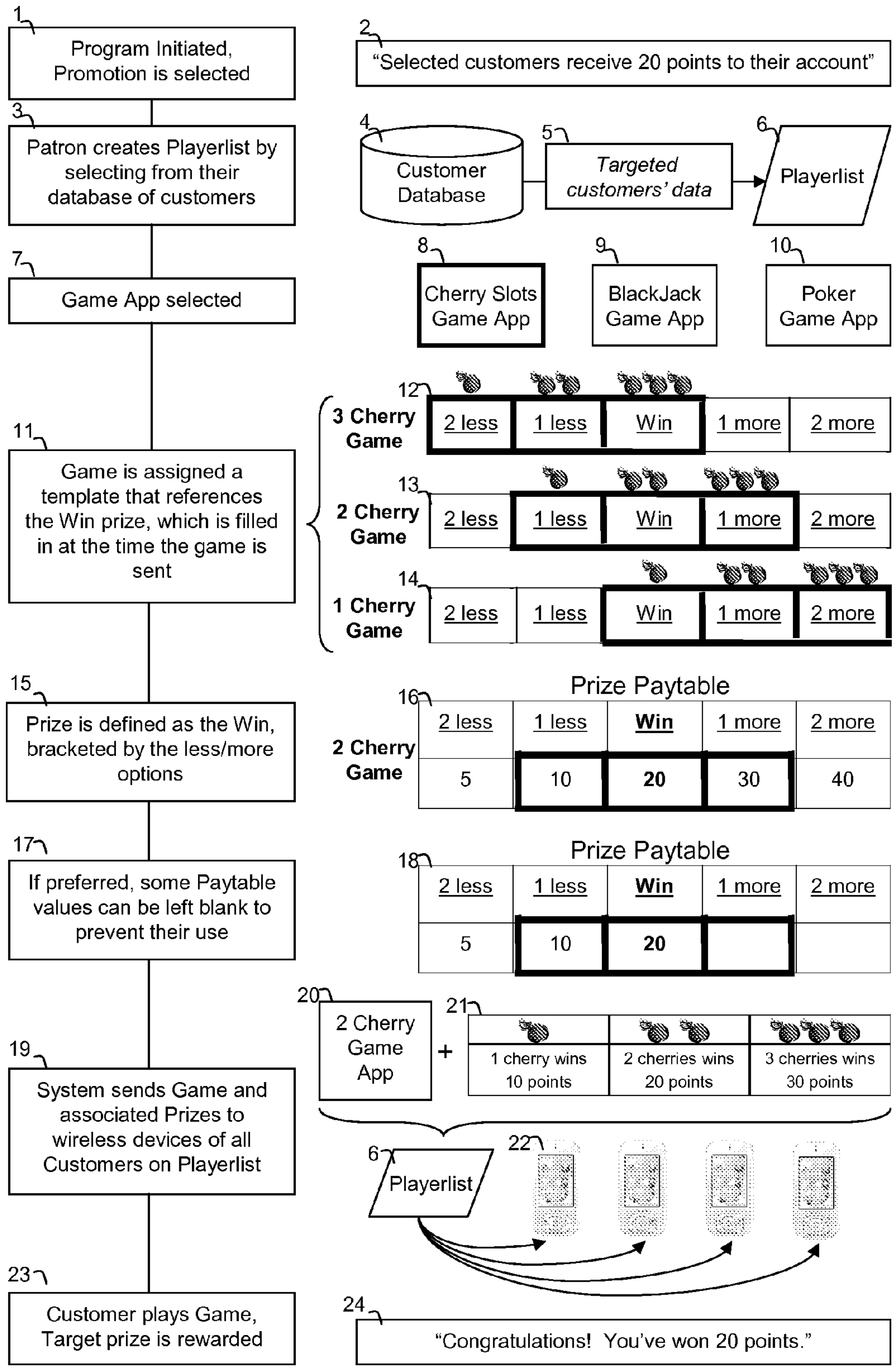
FIG. 1 is a schematic diagram of a method for dynamically binding prizes to a multi-outcome game.

FIG. 1 is a schematic diagram of a method for dynamically binding prizes to a multi-outcome game. At block 1, a software program for dynamically binding prizes to a multi-outcome game is initiated and a specific promotion is selected, for example, block 2, "selected customers receive twenty points to the customer's account" for a rewards or rewards-type club or program. Those skilled in the pertinent art will recognize that other promotions may be selected without departing from the scope and spirit of the present invention. The promotion is preferably based on a database profile of each customer of the plurality of customer names on the playlist and an enterprise profile of the enterprise. The enterprise profile comprises at least one of a geographical location of an enterprise in relation to each customer of the playerlist, a business of the enterprise, a business time period, a government regulation, and a marketing campaign of the enterprise. The database profile of each customer comprises at least one of a geographical location of the customer, contact information including phone number(s) and/or an email address, previous purchases of the customer, an age of the customer, an ethnicity of the customer, a political affiliation of the customer, a religious affiliation of the customer, an educational level of the customer, a college attended by the customer, past travels of the customer, a gender of the customer, a wireless phone carrier of the customer, a hobby of the customer, and a gaming preference of the customer. At block 3, a patron or enterprise creates a playerlist from a customer database 4 with targeted customer data 5 used to generate a playerlist at block 6.

At block 7, the game application is selected. Three possible examples of games are shown in FIG. 1, however those skilled in pertinent art will recognize that many other game applications may be used without departing from the scope and spirit of the present invention. The three games shown are a cherry slots game application 8, a blackjack game application 9 and a poker game application 10.

At block 11, the game application is assigned a template that references a win prize, which is filled in at the time the game is sent to the customers on the playlist. FIG. 1 illustrates a three cherry game template 12, a two cherry game template 13 and a one cherry game template 14. At block 15, the prize is defined as the Win, bracketed by the less/more option. As mentioned above, the prize for the "selected customers receive twenty points to the customer's account" promotion is twenty points. The prize paytable 16 is populated with the Win value of twenty points and the less/more options are also populated with prizes of thirty points for one more cherry, forty points for two more cherries, ten points for one less cherry and five points for two less cherries. Also, at block 17, the paytable values can be valueless and left blank to prevent their use. The prize paytable 18 is populated with the Win value and only the less option is populated with prizes, ten points for one less cherry, and five points for two less cherries.

At block 19, the game is sent along with associated prizes to the data capable communication devices 22 of the customers, for example mobile phones. Specifically, the two cherry game application 20 is sent along with the associated paytable 21 to all of the data capable communication devices 22 of the customers. At block 23, the customers on the playlist play the game application on the data capable communication devices 22, and a target prize is rewarded. For example, a customer receives a message 24, "Congratulations! you've won twenty points." The twenty points or other prize is then credited to the customer's account with the enterprise or rewarded in some other way. A communication (SMS, email, etc.) may also be sent to the customer from the enterprise informing the customer of the crediting of the prize.

In operation, a system and method for dynamic binding of prizes to multi-outcome games is preferably computer implemented software written in programming languages that are capable of running on any operating system. The invention is designed and configured to couple a set of prizes with an interactive digital game application in which the prizes are dynamically bound to the game outcomes at the time the game application is delivered to the player of the game application, who is a customer of an enterprise or a member of a rewards program. The enterprise preferably integrates the software with other existing software to automate the process of sending a promotion to customers as part of a marketing campaign that is targeted to data capable communication devices of customers, which presents the customers with a prize for successfully completing the promotion (playing the game).

The system is configured to integrate a playerlist, which is a list that includes the name, phone number, and other pertinent information of each customer that is targeted for the promotion, one or more target customer data capable communication devices, a game in the form of interactive multimedia mobile content, and a target prize that is tier to the promotion.

The system preferably includes a server on a fixed network, data capable communication devices capable of running mobile software applications, a mobile application resident on each of the data capable communication devices which is designed to execute interactive executable content, and at least one executable interactive content requiring an end user action.

The enterprise selects the promotion, creates a playerlist of target customers, and selects the game application to be sent to the playerlist. The system binds the Win values and paytable to the game application dynamically, assigning a template that references the win prize and defining a set of possible outcomes so that the game action is variable and random. An entire promotion package is preferably sent to the data capable communication devices of the customers on the playerlist for execution by the customers.

Figure 2:
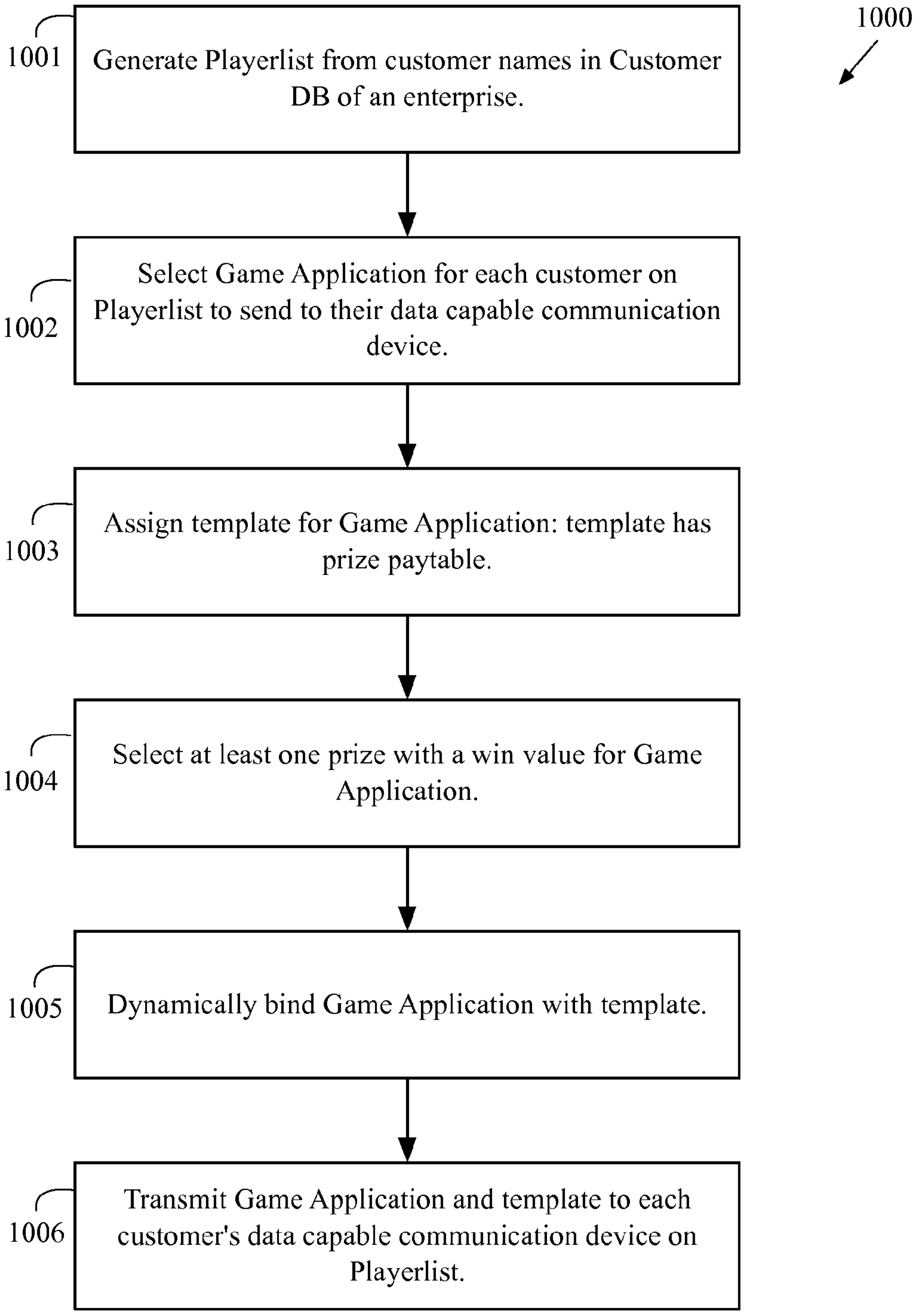
FIG. 2 is a flow chart of a specific method for dynamically binding prizes to a multi-outcome game.

A preferred embodiment of a method 1000 for dynamically binding prizes to a multi-outcome mobile game is shown in FIG. 2. At block 1001, a playerlist is generated from customer names within a customer database of an enterprise. Then at block 1002 a game application is selected for sending to each data capable communication device of each of the customers on the playerlist. At block 1003, a template is assigned for the game application. The template includes a prize paytable. At block 1004, at least one prize with a win value is selected for the game application. The prize is preferably based on a database profile of each customer of the plurality of customer names on the playlist and an enterprise profile of the enterprise. The enterprise profile comprises at least one of a geographical location of an enterprise in relation to each customer of the playerlist, a business of the enterprise, a business time period, a government regulation, and a marketing campaign of the enterprise. The database profile of each customer comprises at least one of a geographical location of the customer, contact information including phone number(s) and/or an email address, previous purchases of the customer, an age of the customer, an ethnicity of the customer, a political affiliation of the customer, a religious affiliation of the customer, an educational level of the customer, a college attended by the customer, past travels of the customer, a gender of the customer, a wireless phone carrier of the customer, a hobby of the customer, and a gaming preference of the customer. At block 1005, each game application is dynamically bound to a template 1005 with a prize paytable. At block 1006, the configured game is then sent to the customer's data capable communication device.

Figure 3:
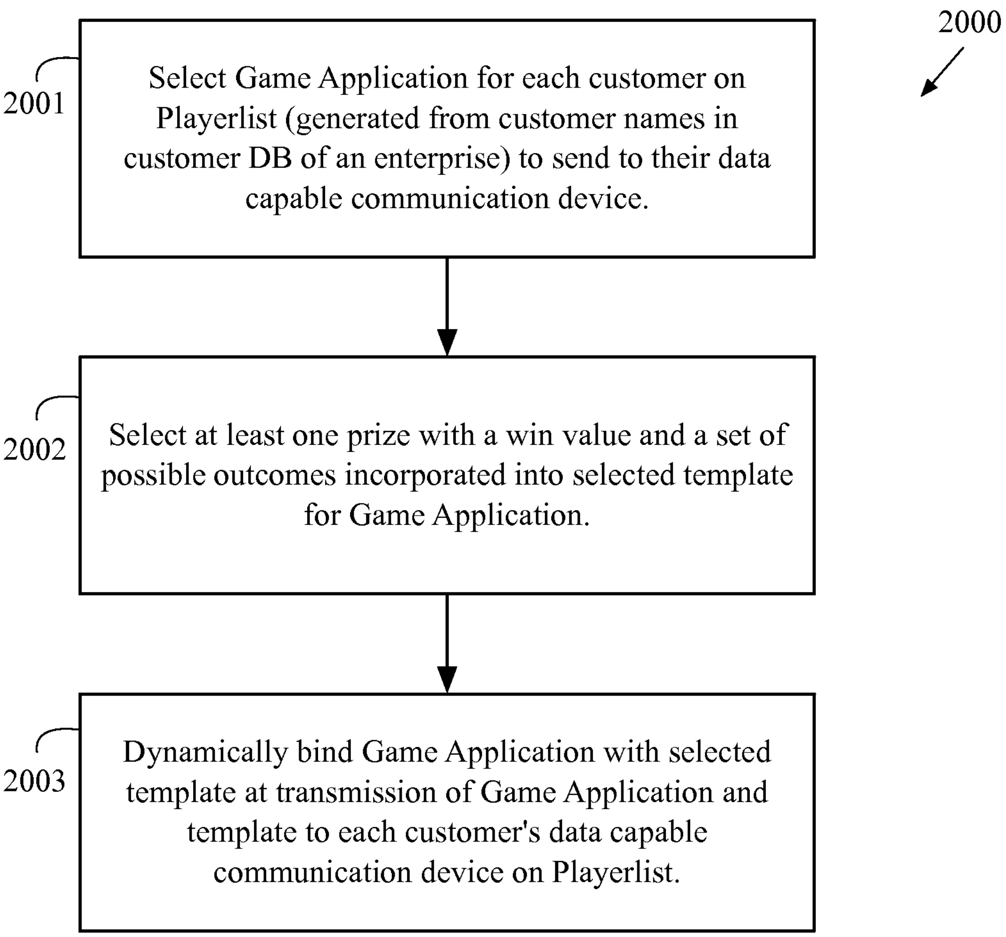
FIG. 3 is a flow chart of a general method for dynamically binding prizes to a multi-outcome game.

Another preferred embodiment of a method 2000 for dynamically binding prizes to a multi-outcome game is shown in FIG. 3. At block 2001, a game application is selected for each customer on a player list generated from customer names within a customer database of an enterprise. At block 2002, at least one prize with a winning value and a set of possible outcomes is selected for each game and is incorporated into a template. The prize is preferably based on a database profile of each customer of the plurality of customer names on the playlist and an enterprise profile of the enterprise. The enterprise profile comprises at least one of a geographical location of an enterprise in relation to each customer of the playerlist, a business of the enterprise, a business time period, a government regulation, and a marketing campaign of the enterprise. The database profile of each customer comprises at least one of a geographical location of the customer, contact information including phone number(s) and/or an email address, previous purchases of the customer, an age of the customer, an ethnicity of the customer, a political affiliation of the customer, a religious affiliation of the customer, an educational level of the customer, a college attended by the customer, past travels of the customer, a gender of the customer, a wireless phone carrier of the customer, a hobby of the customer, and a gaming preference of the customer. At block 2003, the game application and the configured template are bound during transmission of the game to the customer's mobile device.

In both the embodiments above, the configured game is preferably a card game, such as but not limited to, slots, blackjack, or poker. The game is preferably played on the mobile device of the customer. The mobile device is preferably a cellular phone or a tablet computer.

Figure 4:
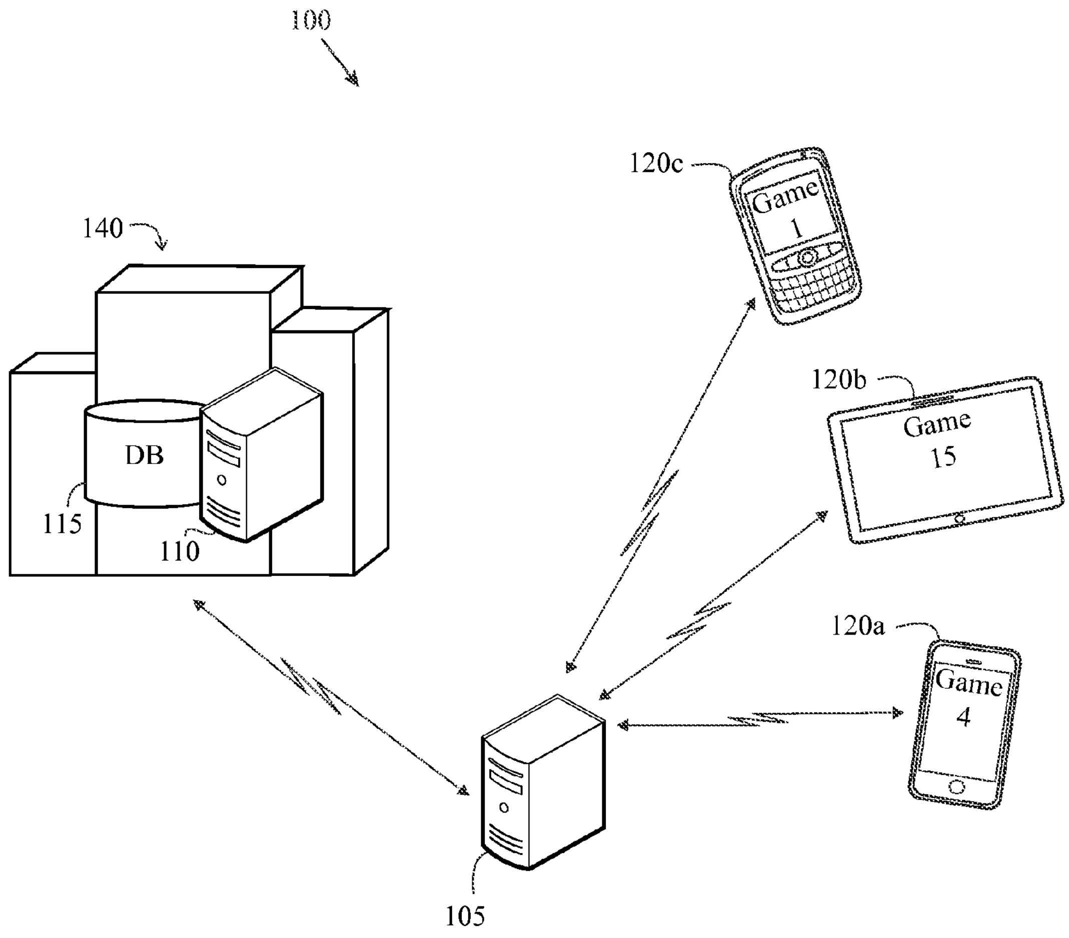
FIG. 4 is a block diagram of a system for dynamically binding prizes to a multi-outcome game.

A preferred embodiment of a system 100 for dynamically binding prizes to a multi-outcome mobile game is shown in FIG. 4. A system 100 comprises of an enterprise 140 with a server 110 and a customer database, a content server 105, and data capable mobile devices 120*a*-120*c*.

An enterprise's customer database 115 contains customer profiles and each customer profile comprises at least one of a customer name, a geographical location of the customer, contact information including phone number(s) and/or an email address, previous purchases of the customer, an age of the customer, an ethnicity of the customer, a political affiliation of the customer, a religious affiliation of the customer, an educational level of the customer, a college attended by the customer, past travels of the customer, a gender of the customer, a wireless phone carrier of the customer, a hobby of the customer, and a gaming preference of the customer. A server 110 generates a player list from the database 115 of customers who will be sent a game. The server 110 communicates between the database 115 and the content server 105.

A content server 105 contains the game applications and templates. Each template has a prize paytable. The content server 105 communicates with the enterprise server 110 and each of the mobile devices 120*a*-120*c*.

The mobile devices 120*a*-120*c* associated with the player list have a mobile resident software application. The game selected for the mobile device is dynamically bound to a template with a prize value and a set of possible outcomes at the time of transmission from the content server 105 to the mobile devices 120*a*-120*c*.

In a preferred embodiment of a system 100, the configured game can be a card game, such as but not limited to, slots, blackjack, or poker. The mobile device can be a cellular phone or a tablet computer.

Figure 5:
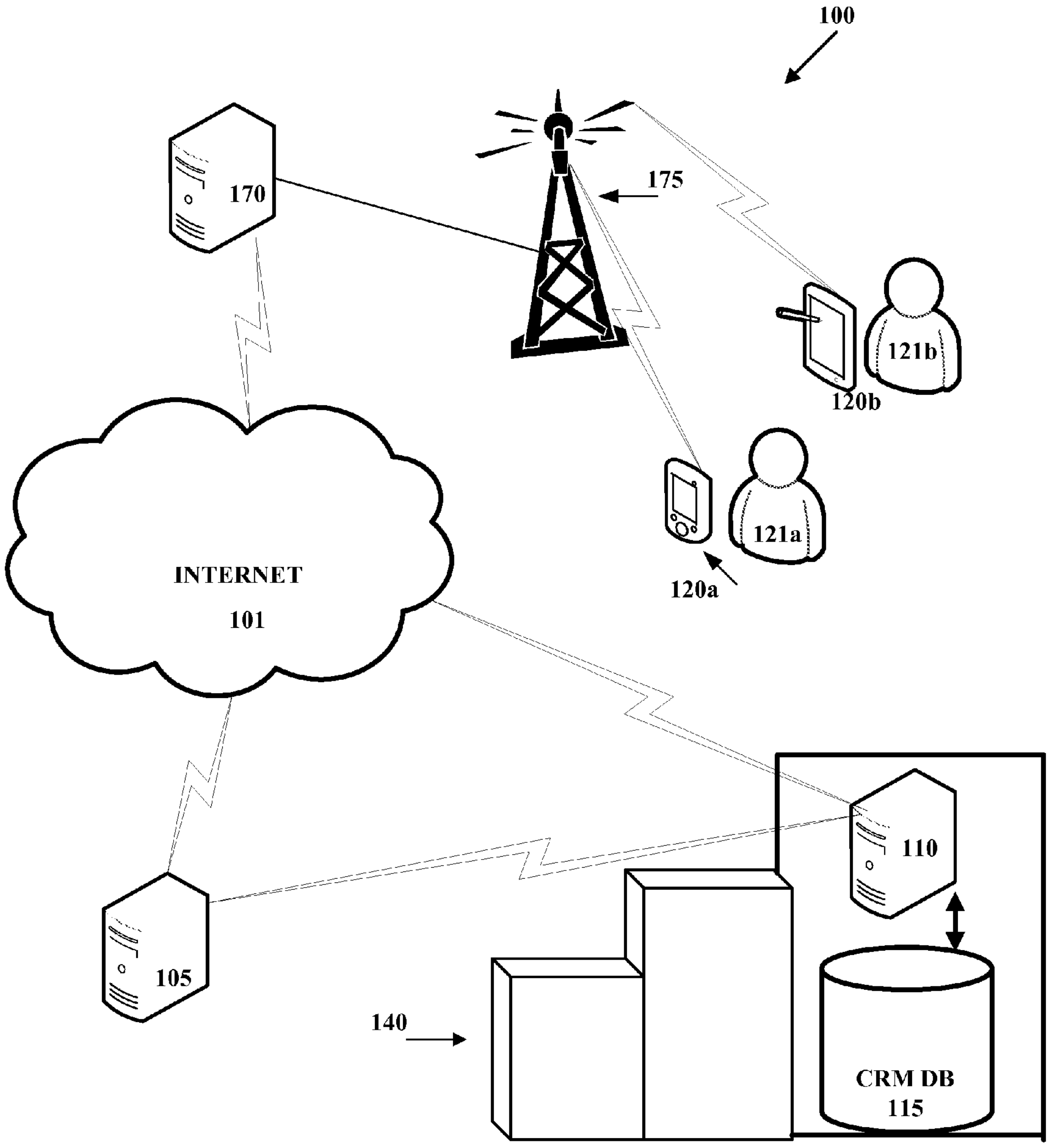
FIG. 5 is a block diagram of an alternative system for dynamically binding prizes to a multi-outcome game.

An alternative system 100 for dynamically binding prizes to a multi-outcome game is shown in FIG. 5. The system 100 allows an enterprise 140 generate a playerlist of customer names from a CRM database 115 of the enterprise 140 and send a game application to the customers 121*a* and 121*b* on the playerlist while dynamically binding prizes and outcomes of the game application just prior to or during transmission of the game to the customers 121*a* and 121*b* on the playerlist. The system 100 also preferably includes a content server 105 and a mobile communication service provider 170 with antennas 175 for transmissions over a mobile communication network. The content server 105 and the enterprise communicate over the Internet 101. The enterprise site 140 preferably includes a CRM database 115 and a server 110. The enterprise site 140 preferably communicates with the content server 105 over the Internet 101 for a sending game applications to data capable communication devices 120*a* and 120*b* of customers 121*a* and 121*b*. The content server 105 preferably communicates with the mobile communication service provider 170 over the Internet 101. The customers 121*a* and 121*b* can use the data capable communication devices 120*a* and 120*b* to access the Internet 101 using WiFi or the like, in addition to using the mobile communication network. In a preferred embodiment, the enterprise 140 communicates with the content server 105, and the content server 105 transmits the game application, while dynamically binding the prizes and outcomes to the game application, to the mobile communication service provider 170 for transmission to the data capable communication devices 120*a* and 120*b* of the customers 121*a* and 121*b* on the playerlist. Alternatively, the enterprise 140 communicates with the content server 105, and the enterprise 140 transmits the game application, while dynamically binding the prizes and outcomes to the game application, to the mobile communication service provider 170 for transmission to the data capable communication devices 120*a* and 120*b* of the customers 121*a* and 121*b* on the playerlist. Those skilled in the pertinent art will recognize other communication flows that may be used without departing from the scope and spirit of the present invention.

From the foregoing it is believed that those skilled in the pertinent art will recognize the meritorious advancement of this invention and will readily understand that while the present invention has been described in association with a preferred embodiment thereof, and other embodiments illustrated in the accompanying drawings, numerous changes modification and substitutions of equivalents may be made therein without departing from the spirit and scope of this invention which is intended to be unlimited by the foregoing except as may appear in the following appended claim. Therefore, the embodiments of the invention in which an exclusive property or privilege is claimed are defined in the following appended claims.

We claim as our invention:

1. A method for dynamically binding prizes to a multi-outcome game, the method comprising:

generating a playerlist from a plurality of customer names in a customer database of an enterprise;

selecting a game application to be sent to a mobile phone of each customer of the playerlist, the mobile phone comprising a resident mobile application which is configured to execute interactive executable content;

assigning a template for the game application, the template having a prize paytable;

selecting at least one prize for the game application, the at least one prize having a win value;

dynamically binding the game application with the template; and transmitting the game application and the template over a communications network to the mobile phone of each customer of the playerlist;

receiving the game application and the template at the mobile phone wherein the game application is executed on the mobile phone by the resident mobile application with customer interaction.

2. The method according to claim 1 wherein selecting at least one prize with a win value comprises determining the at least one prize based on a database profile of each customer of the plurality of customer names on the play list and an enterprise profile.

3. The method according to claim 2 wherein:

the enterprise profile comprises at least one of a geographical location of an enterprise in relation to each customer of the playerlist, a business of the enterprise, a business time period, a government regulation, and a marketing campaign of the enterprise; and the database profile of each customer comprises at least one of a customer name, a geographical location of the customer, previous purchases of the customer, an age of the customer, an ethnicity of the customer, a political affiliation of the customer, a religious affiliation of the customer, an educational level of the customer, a college attended by the customer, past travels of the customer, a gender of the customer, a wireless phone carrier of the customer, contact information of the customer, a phone number of the customer, a hobby of the customer, and a gaming preference of the customer.

4. The method according to claim 1 further comprising playing the game of the game application on the mobile phone of each customer of the playerlist.

5. The method according to claim 1 wherein the game application is for a slots game application, a blackjack game application or a poker game application.

6. A method for dynamically binding prizes to a multi-outcome game, the method comprising:

selecting a game application to be sent to a mobile phone of each customer of a plurality of customers of a playerlist generated from an enterprise customer database, the mobile phone comprising a resident mobile application which is configured to execute interactive executable content;

selecting at least one prize for the game application, the at least one prize having a win value and a set of possible outcomes incorporated into a selected template; and dynamically binding the game application with the selected template at transmission of the game application and the selected template over a communications network to the mobile phone of each customer of the playerlist;

receiving the game application and the template at the mobile phone wherein the game application is executed on the mobile phone by the resident mobile application with customer interaction.

7. The method according to claim 6 wherein selecting at least one prize with a win value comprises determining the at least one prize based on a database profile of each customer of the plurality of customer names on the play list and an enterprise profile.

8. The method according to claim 7 wherein:

the enterprise profile comprises at least one of a geographical location of an enterprise in relation to each customer of the playerlist, a business of the enterprise, a business time period, a government regulation, and a marketing campaign of the enterprise; and the database profile of each customer comprises at least one of a customer name, a geographical location of the customer, previous purchases of the customer, an age of the customer, an ethnicity of the customer, a political affiliation of the customer, a religious affiliation of the customer, an educational level of the customer, a college attended by the customer, past travels of the customer, a gender of the customer, a wireless phone carrier of the customer, contact information of the customer, a phone number of the customer, a hobby of the customer, and a gaming preference of the customer.

9. The method according to claim 6 further comprising generating the playerlist from a plurality of customer names in a customer database of an enterprise.

10. The method according to claim 6 further comprising playing the game of the game application on the mobile phone of each customer of the playerlist.

11. The method according to claim 6 wherein the game application is for a slots game application, a blackjack game application or a poker game application.

12. A system for dynamically binding prizes to a multi-outcome game, the system comprising:

a plurality of mobile phones associated with a playerlist, each of the plurality of mobile phones comprising a mobile resident software application which is configured to execute interactive executable content;

a content server comprising a plurality of game applications and a plurality of templates, each of the plurality of templates having a prize paytable;

a customer database comprising a plurality of customer profiles, each customer profile comprising a customer name and contact information for a mobile phone of a customer;

a patron server in communication with the customer database and the content server;

a communications network;

wherein a playerlist of customers to receive a game application is generated from the plurality of customer profiles at the customer database;

wherein each game application is dynamically assigned a template referencing a prize value and a set of possible outcomes at the transmission over the communications network to the plurality of mobile phones associated with the playerlist, wherein the game application is executed on a mobile phone by the resident mobile application with customer interaction.

13. The system according to claim 12 wherein the game application is for a slots game application, a blackjack game application or a poker game application.

14. The system according to claim 12 wherein prize value based on a database profile of each customer of the plurality of customer names on the play list and an enterprise profile.

15. The system according to claim 14 wherein:

the enterprise profile comprises at least one of a geographical location of an enterprise in relation to each customer of the playerlist, a business of the enterprise, a business time period, a government regulation, and a marketing campaign of the enterprise; and the database profile of each customer comprises at least one of a customer name, a geographical location of the customer, previous purchases of the customer, an age of the customer, an ethnicity of the customer, a political affiliation of the customer, a religious affiliation of the customer, an educational level of the customer, a college attended by the customer, past travels of the customer, a gender of the customer, a wireless phone carrier of the customer, contact information of the customer, a phone number of the customer, a hobby of the customer, and a gaming preference of the customer.

* * * * *